US009025969B2

(12) United States Patent
Li et al.

(10) Patent No.: US 9,025,969 B2
(45) Date of Patent: May 5, 2015

(54) METHOD WITH IMPROVED PHASE ROBUSTNESS IN COHERENT DETECTED OPTICAL SYSTEM

(75) Inventors: Chuandong Li, Ottawa (CA); Yuanjie Chen, Saratoga, CA (US); Zhuhong Zhang, Ottawa (CA); Yi Cai, Jackson, NJ (US); Fei Zhu, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 108 days.

(21) Appl. No.: 13/480,230

(22) Filed: May 24, 2012

(65) Prior Publication Data

US 2013/0315609 A1    Nov. 28, 2013

(51) Int. Cl.
  *H04B 10/06*      (2006.01)
  *H04B 10/61*      (2013.01)

(52) U.S. Cl.
  CPC .......... *H04B 10/613* (2013.01); *H04B 10/6164* (2013.01)

(58) Field of Classification Search
  CPC .................................................. H04B 10/6164
  See application file for complete search history.

(56) References Cited

U.S. PATENT DOCUMENTS

| 5,289,505 | A * | 2/1994 | LaRosa et al. ................. 375/329 |
| 7,684,712 | B1 * | 3/2010 | Roberts et al. ................. 398/208 |
| 2009/0129787 | A1 * | 5/2009 | Li et al. .......................... 398/208 |
| 2010/0329698 | A1 * | 12/2010 | Nakashima .................... 398/208 |
| 2011/0033184 | A1 * | 2/2011 | Zhang et al. ..................... 398/65 |
| 2011/0150505 | A1 * | 6/2011 | Roberts et al. ................. 398/208 |
| 2012/0008952 | A1 * | 1/2012 | Li et al. ........................... 398/65 |
| 2013/0045015 | A1 * | 2/2013 | Kuschnerov et al. ......... 398/208 |
| 2013/0209089 | A1 * | 8/2013 | Harley et al. ................... 398/25 |

FOREIGN PATENT DOCUMENTS

| WO | WO 2011/072980 A1 | 6/2011 |
| WO | WO 2012/006575 A1 | 1/2012 |

OTHER PUBLICATIONS

Reinhold Noe, "Phase Noise-Tolerant Synchronous QPSK/BPSK Baseband-Type Intradyne Receiver Concept With Feedforward Carrier Recovery", Journal of Lightwave Technology, vol. 23, No. 2, Feb. 2005, 7 pages.

* cited by examiner

*Primary Examiner* — Ken Vanderpuye
*Assistant Examiner* — Jai Lee
(74) *Attorney, Agent, or Firm* — Robert McCutcheon

(57) ABSTRACT

An optical signal receiver tracks local oscillator frequency offset (LOFO) and compensates for the phase distortion introduced in the received signals as a result of utilizing the local oscillator within a coherent detection scheme. This phase distortion is basically a constant phase rotation caused by the LOFO and implementation of the receiver using coherent detection and a digital interferometer instead of a conventional (yet complex) carrier phase estimation or recovery scheme. With an optical receiver implemented in this manner, the requirement of using a precise local oscillator laser with low frequency offset is less important.

14 Claims, 4 Drawing Sheets

METHOD WITH IMPROVED PHASE ROBUSTNESS IN COHERENT DETECTED OPTICAL SYSTEM

TECHNICAL FIELD

The present invention relates generally to optical communication systems, and more particularly, to methods and devices for receiving and processing optical communication signals.

BACKGROUND

Optical communication technology has moved from simple amplitude modulation (AM) to more advanced modulation techniques using both amplitude and phase. With increasing demand for higher throughput, optical communication systems have adopted these more advanced modulation formats which require increasing spectral efficiency of the system. One of these formats is differential QPSK (DQPSK), in which information bits are coded as phase transient between adjacent symbols. DQPSK has a high tolerance for phase noise.

One simple way to decode a DQPSK signal is by using an analog DQPSK decoder, sometimes referred to as an optical delay interferometer. With reference to FIG. 1, there is illustrated such a prior art decoder or interferometer in which the optical signal is delayed and added before detected by an intensity detector. However, the drawback to this simplicity is that only amplitude is detected and all of the phase information of the received signal is lost. With increasing baud rates, the signal is more and more sensitive to link impairment, such as dispersion and Polarization Mode Dispersion (PMD), which introduces amplitude and phase distortion to the optical signal. With only signal amplitude being detected, there is no effective method to compensate for these impairments and increase performance.

To recover both amplitude and phase of the received optical signal, coherent detection techniques have been widely adopted in new generation optical communication systems. Turning to FIG. 2, there is illustrated the basic structure of a coherent detection system or receiver. The outputs of this receiver are two electrical signals corresponding to the in-phase (I) and the quadrature (Q) of received optical signal $E_s$.

In the coherent detection technique, an important aspect is carrier phase recovery or estimation (CPR) which recovers and compensates for phase noise in the received optical signal, thus enabling recovery of the information data. FIG. 3 illustrates an example structure of a prior art CPR. For DQPSK signals, a digital differential decoding module is usually implemented after the CPR. There are drawbacks to using coherent detection with CPR. Implementation of the CPR can be quite complex, and a CPR's bandwidth is limited by hardware feasibility. As a result, CPR is limited and cannot handle high phase noise with wide bandwidth.

In an optical communication system, there may be present some specific link conditions which could lead to high phase noise due to fiber nonlinearity. In these applications, the conventional CPR (feed forward or backward) does not provide a large enough bandwidth to compensate for the phase distortion. The inventors have determined that one possible way to effectively overcome these issues is to utilize a digital delay interferometer (similar to FIG. 1) but utilize a digitally recovered signal to replace the analog optical signal. Compared to the analog optical interferometer mentioned above, there would be several advantages. First, existing DSP techniques can be used to compensate for link impairments. Second, CPR can be eliminated thus dramatically simplifying implementation and reducing cost. Lastly, this method can tolerate high phase noise.

However, in such a proposed system, the recovered electrical signals may incur a constant phase ramp because of frequency offset between the laser in the transmitter and the laser utilized as the local oscillator (e.g., LO in FIG. 2).

In the reception of optical signals by an optical signal receiver, unwanted laser phase noise and frequency offset resulting from application of a local oscillator laser in the receiver (that is different from the laser in the transmitter) are injected into the received optical signals. These must be removed (or substantially reduced) prior to demodulation to enable successful recovery of the information data. Because of this, optical transmitters and receivers have commonly utilized oscillator lasers with low phase noise. These low phase noise oscillator lasers are expensive. Therefore, there is needed a method and system that improves coherent detection in optical communications systems that implement advanced modulation formats while also reducing system cost by enabling the use of less expensive local oscillator lasers.

SUMMARY

In accordance with one embodiment, there is provided a method of signal processing in an optical communications receiver. The method includes receiving a modulated optical signal and coherently detecting the modulated optical signal and generating a first in-phase (I) component signal and a first quadrature (Q) component signal, converting the first I component signal and the first Q component signal into a first digital I signal and a first digital Q signal, adaptively equalizing the first digital I signal and the first digital Q signal to compensate for channel distortion introduced into the received modulated optical signal from a communication channel, and decoding the equalized first digital I signal and the first digital Q signal to generate an output signal. The method also includes compensating for phase distortion in the output signal caused by a local oscillator frequency offset (LOFO), the phase distortion introduced into the first I component signal and the first Q component signal by a local oscillator signal utilized during coherent detection of the modulated optical signal.

In accordance with another embodiment of the present disclosure, there is provided an optical signal receiver including a coherent detector configured to receive a modulated optical signal and generate a first in-phase (I) component signal and a first quadrature (Q) component signal, an analog to digital converter (ADC) coupled to the coherent detector for converting the first I component signal and the first Q component signal into a first digital I signal and a first digital Q signal, an adaptive equalizer coupled to the ADC and configured to compensate for channel distortion introduced into the received modulated optical signal from a communication channel, and a decoder configured to decode the equalized first digital I signal and the first digital Q signal to generate an output signal. The receiver further includes a phase distortion compensator configured to compensate for a phase distortion in the output signal caused by a local oscillator frequency offset (LOFO), the phase distortion introduced into the first I component signal and the first Q component signal by a local oscillator signal utilized by the coherent detector.

In still another embodiment, there is provided a wireless method for signal processing in an optical communications receiver. The method includes receiving a modulated optical signal and coherently detecting the modulated optical signal and generating a first channel in-phase (I) component, a first channel quadrature (Q) component, a second channel I component and a second channel Q component. The signals are converted into first digital I and Q signals second digital I and Q signals which are then adaptively equalized to compensate for channel distortion introduced into the received modulated optical signal from a communication channel. The equalized signals are differentially decoded to generate a first output signal and a second output signal. The method further includes compensating for phase distortion in the first output signal and the second output signal caused by a local oscillator frequency offset (LOFO), where the phase distortion is introduced into the first channel I and Q components and the second channel I and Q components by a local oscillator signal utilized during coherent detection of the modulated optical signal.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

In general terms, the present disclosure describes and teaches methods and devices in an optical communications receiver for tracking and compensating for local oscillator frequency offset (LOFO) without using carrier phase estimation or recovery (CPR).

Figure 4:
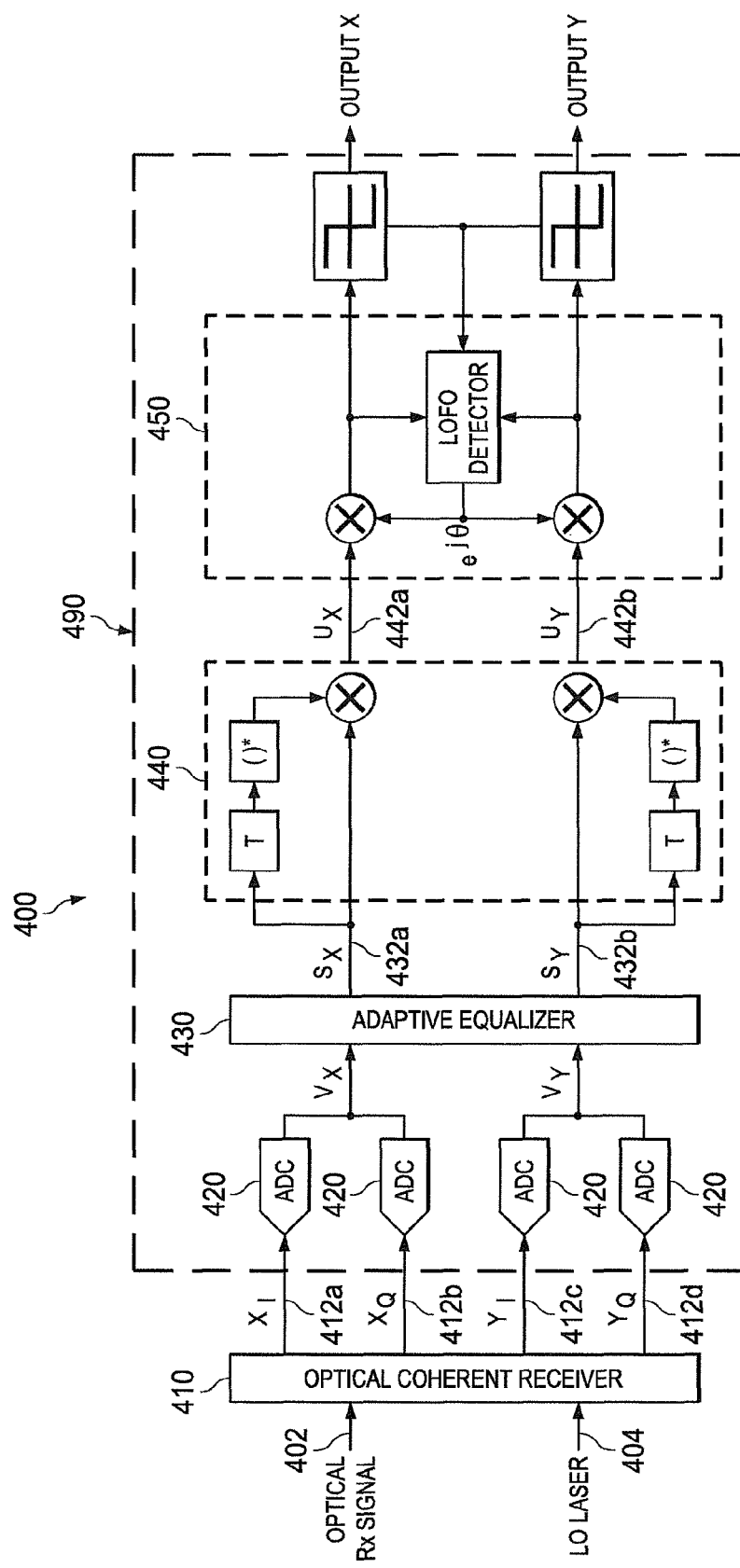
FIG. 4 is a block diagram illustrating an optical signal receiver in accordance with one embodiment of the present disclosure.

Now turning to FIG. 4, there is shown a block diagram of relevant components or elements of an optical communications receiver 400. For purposes of clarity, not all elements within the optical receiver are shown or described, and only those elements necessary for an understanding of the present disclosure are shown. Other embodiments of the optical receiver 400 may be used without departing from the scope of this disclosure. Any reference to "standards" in the following text is meant to encompass existing and future versions of the referenced standards, as well as standards encompassing the principles of the invention disclosed and claimed herein. In this example, the optical receiver 400 is part of (or communicates with) a larger optical communication system or network (not shown) or other devices or modules.

The optical signal receiver 400 includes an optical coherent receiver 410, an analog to digital converter (ADC) 420, an adaptive equalizer 430, a digital delay interferometer 440, and a local oscillator frequency offset (LOFO) tracking and compensation module 450. As illustrated, in one embodiment, the elements 410, 420, 430 and 440 (those within the dotted lines) are configured as or in (or form) a digital signal processing (DSP) engine, module or processor 490 (hereinafter simply referred to as the DSP 490).

The coherent receiver 410 performs coherent detection (or decoding) of a received optical signal 402 and generates four electrical output signals 412a thru 412d ($X_I X_Q Y_I Y_Q$). The X and Y signals represent two polarized signals, and each X and Y signal has both in-phase (I) and quadrature (Q) components. A local oscillator (LO) laser signal 404 generated by a LO laser (not shown) is input to the coherent receiver 410. As will be appreciated, the phase and/or frequency of the LO laser signal 404 is usually slightly different than the phase and frequency of transmitter oscillator laser (not shown) used to generate the transmitted optical signal received by the receiver 400.

Each of the four signals 412a-d are converted to digital signals by the ADC 420 and input to the adaptive equalizer 430 where distortions present in the received signals caused by the communications channel/line and hardware are removed/reduced (i.e., compensated). Such distortions may include dispersion, polarization rotation, etc. The adaptive equalizer 430 outputs complex signals 432a and 432b ($S_X S_Y$) which are relatively distortion free. Within (or prior to) the equalizer 430, the I and Q components of each channel (X channel, Y channel) are combined and form channels of complex signals (e.g., I+jQ) and the equalization is performed mathematically based on the complex numbers.

As will be appreciated, the recovered output signals 412a thru 412d from the coherent receiver 410 can be written as:

$$V_{X,Y}(t) = [D_{X,Y}(t) \otimes H_{link}] \cdot e^{j \cdot (2 \pi \cdot \Delta f \cdot t + \phi(t))} \quad \text{Equation 1}$$

$D_{X,Y}(t)$ is the differential coded information bits on the X and Y polarization signals, $H_{link}$ is the combined transfer function of the link and hardware, $\Delta f$ is the LOFO as compared to the transmitter carrier frequency, and $\phi(t)$ is the random phase noise introduced by laser and link propagation.

The distortions from the communication channel/line and hardware impairments are compensated for in the adaptive equalizer 430.

After the equalizer 430, the output signals $S_X$ and $S_Y$ pass through the digital delay interferometer 440 which generates output signals 442a and 442b ($U_X U_Y$). The output of the digital interferometers 440 is:

$$U_{X,Y}(nT) = S(nT) \cdot S^*(nT+T) \cdot e^{j(2 \pi \cdot \Delta f \cdot T + \phi(nT) - \phi(nT+T))} \quad \text{Equation 2}$$

where T is the baud duration of one symbol.

As mentioned above, with the DQPSK format, information bits are coded as transient between adjacent symbols. S(nT) S*(nT+T) in Equation 2 represents a differential decoding operation, which extracts the information bits which were differentially coded. It will be understood from Equation 2 that, in addition to the decoded information bits, there exists an extra phase term φ. This phase term can cause performance degradation.

Figure 1:
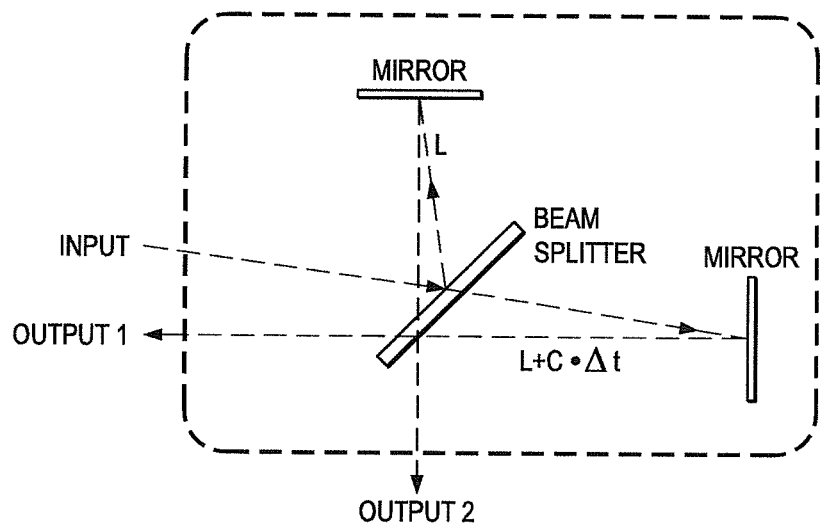
FIG. 1 depicts a prior art DQPSK decoder (or analog interferometer)
Figure 2:
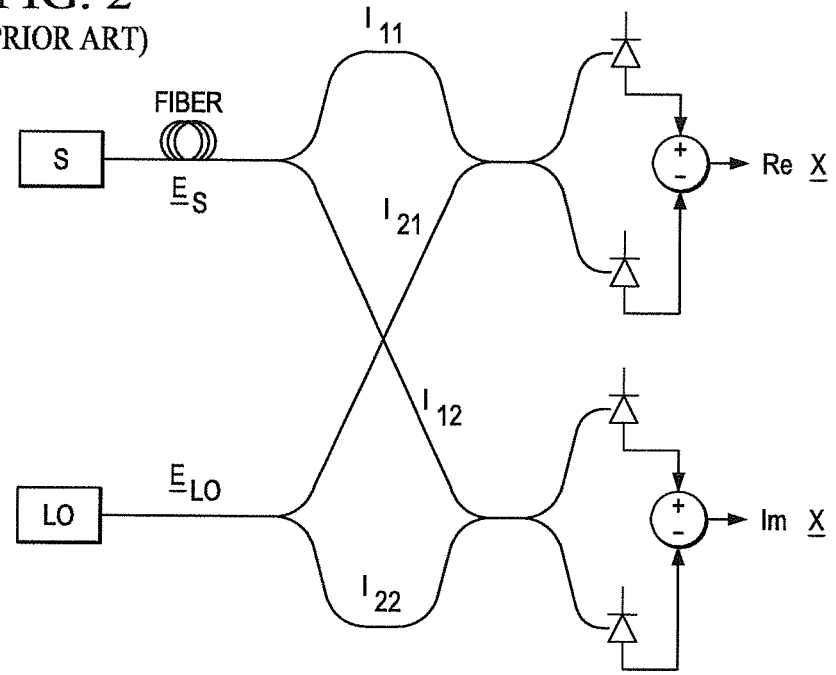
FIG. 2 depicts a prior art coherent detection system.
Figure 3:
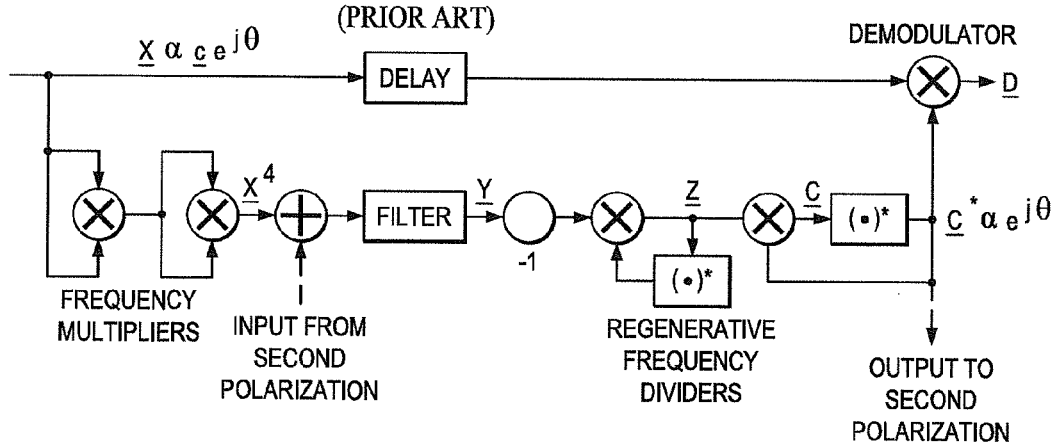
FIG. 3 depicts a prior art carrier phase estimation or recovery system typically used with a coherent detection system.
Figure 5:
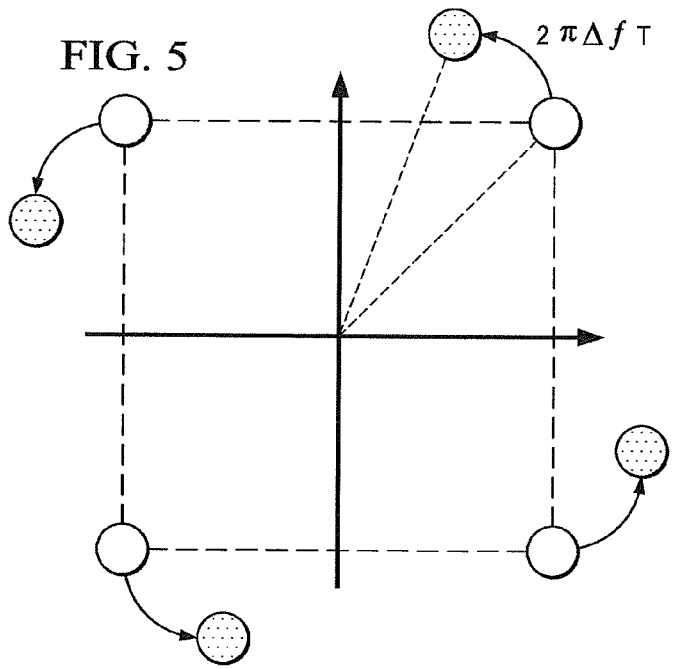
FIG. 5 illustrates a change in phase of the received signal due to the local oscillator frequency offset (LOFO)

In an optical communication system, the phase noise φ(t) usually has a much narrower bandwidth than the baud rate which is at 10 GHz or above, corresponding to T<100 pa in Equation 2. Within this short duration, the phase noise φ(nT)–φ(nT+T) is negligible. This leaves the local oscillator frequency offset (LOFO) as the only significant source of performance impairment (e.g., phase distortion) which could be up to 3 GHz (as defined in ITU standard). On the recovered signals, the LOFO adds a constant phase rotation, as shown in FIG. 5.

With knowledge of this impact on the recovered signals, a phase de-rotation with a value calculated based on the LOFO can be used to eliminate/reduce (i.e., compensate for) the LOFO injected phase distortion.

Figure 6:
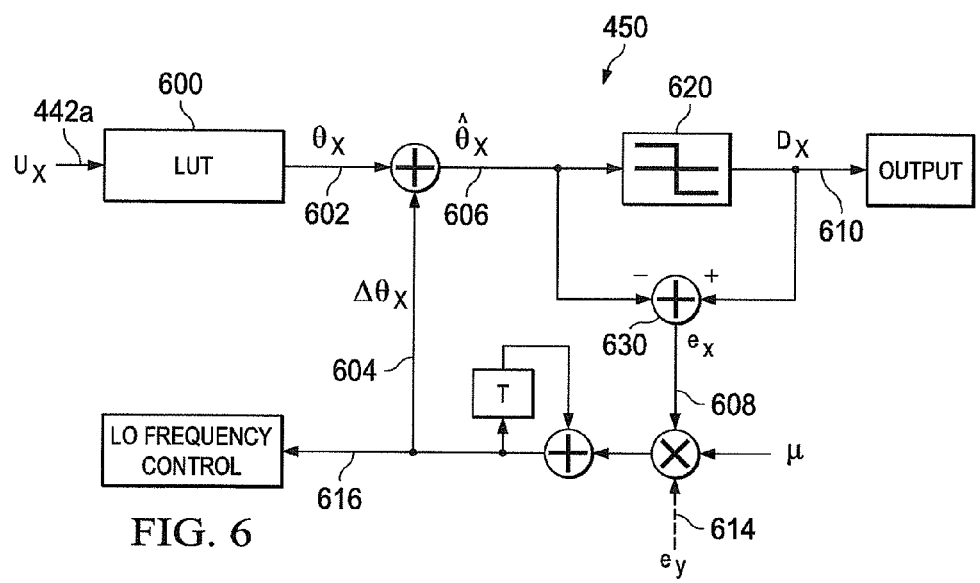
FIG. 6 is a block diagram illustrating a LOFO tracking and compensation circuit in accordance with one aspect of the present disclosure.

Now turning to FIG. 6, there is illustrated in more detail a relevant portion of the LOFO tracking and compensation module 450. FIG. 6 shows only shows the processing in one polarization branch (X branch), and it will be understood that another similar polarization branch (Y branch) is included in the module 450 (though not shown).

After passing through the equalizer 440 and the digital interferometer 440, the signal 442a passes through a Look-Up-Table (LUT) 600, in which the complex signal is mapped to a corresponding phase angle signal 602 ($\theta_X$). In this embodiment using this mapping, all of the subsequent signal processing (digital) can be done with simple real number addition, instead of complex multiplication, and the corresponding implementation complexity is reduced.

The phase angle signal 602 ($\theta_X$) is corrected/compensated by being added to a LOFO-based phase angle offset signal 604 ($\Delta\theta_X$) to generate a post-correction phase signal 606 ($\hat{\theta}_X$) which is input to a symbols slicer 620 and a residual error calculator 630. In the symbols slicer 620, the corrected phase signal 606 ($\hat{\theta}_X$) is decoded into information bits $D_X$ as $\{1,0\}$. The signal 604 is sometimes referred to as an adaptive phase offset correction. A residual error signal 608 ($e_x$) is calculated as the difference between phase before and after the symbol slicer 620. In other words, the residual error signal 608 ($e_x$) is calculated as the difference between the post correction phase signal 606 ($\hat{\theta}_X$) and a symbol slicer output signal 610 ($D_X$). This residual error indicates the accuracy of an initial LOFO estimation which is reflected in the LOFO-based phase angle offset signal 604 ($\Delta\theta_X$).

The post correction phase signal 606 ($\hat{\theta}_X$) in the form of symbols is sliced and decoded by the symbol slicer 620 to recover the data information bits (Output X, Output Y) contained therein (the slicer output signal 610). These output signals may be further processed by the receiver 400 (not shown). As will be appreciated, the symbols slicer 620 may be separate from the module 450.

As noted above, FIG. 6 only shows processing in one polarization branch. There is a similar processing module in the Y branch. A second residual error signal 614 ($e_y$) can be used with the residual error signal 608 ($e_x$) to improve the accuracy of error estimation, which can be impacted by optical noise.

The detected phase error is used to update the phase angle offset signal 604 ($\Delta\theta_X$) which will be applied to correct phase error in the following symbols, and so on and so forth. This updating process, with the residual error signal 608 ($e_x$) (used as feedback) forms a digital Phase Lock Loop (PLL). This step may be necessary because of laser frequency wandering in a real application scenario. The bandwidth of this PLL can be controlled through a user defined step size µ, to reach optimum balance between tracking speed and noise impact.

To further improve overall optical receiver 400 and system stability, the LOFO-based adaptive phase angle offset signal 604 ($\Delta\theta_X$) can be used to generate a control signal 616 operable for controlling the local oscillator laser (not shown). This signal may be fed back to the laser to move it to the right frequency grid and operably adjust the LO signal.

As will be understood, the functionality (and algorithms described above) of the LOFO tracking and compensation module 450 may be implemented within the DSP 490. In addition, the functionality (and algorithms described above) of the equalizer 430 and/or digital interferometer 440 may also be implemented by the DSP 490.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of signal processing in an optical communications receiver, the method comprising:
   receiving a modulated optical signal;
   coherently detecting the modulated optical signal and generating a first in-phase (I) component signal and a first quadrature (Q) component signal;
   converting the first I component signal and the first Q component signal into a first digital I signal and a first digital Q signal;
   adaptively equalizing the first digital I signal and the first digital Q signal to compensate for channel distortion introduced into the received modulated optical signal from a communication channel;
   decoding, by a digital interferometer, the equalized first digital I signal and the first digital Q signal to generate an output signal; and
   receiving the output signal, mapping the output signal to a phase angle signal using a look-up table, and using the phase angle signal to compensate for phase distortion in the received output signal caused by a local oscillator frequency offset (LOFO) and generate a compensated output signal from which data information is recovered, the phase distortion introduced into the first I component signal and the first Q component signal by a local oscillator signal utilized during coherent detection of the modulated optical signal.

2. The method in accordance with claim 1 further comprising:
   generating an adaptive phase angle offset signal error signal operable for adjusting the local oscillator signal.

3. The method in accordance with claim 1 wherein the received modulated optical signal comprises a differential quadrature phase shift key (DQPSK) modulated signal.

4. The method in accordance with claim 1 wherein compensating for phase distortion comprises:
combining a local oscillator frequency offset (LOFO)-based phase angle signal with the phase angle signal to generate a corrected phase angle signal;
processing the corrected phase angle signal to generate an information data signal;
combining the corrected phase angle signal with the information data signal to generate an error signal, wherein the LOFO-based phase angle signal is based upon the error signal.

5. The method in accordance with claim 4 wherein processing the corrected phase angle signal to generate the information data signal is performed by a symbol slicer.

6. The method in accordance with claim 1 wherein compensating for phase distortion comprises:
updating the phase angle offset signal which functions to compensate for phase distortion thereby creating a digital phase lock loop.

7. An optical signal receiver, comprising:
a coherent detector configured to receive a modulated optical signal and generate a first in-phase (I) component signal and a first quadrature (Q) component signal;
an analog to digital converter (ADC) coupled to the coherent detector for converting the first I component signal and the first Q component signal into a first digital I signal and a first digital Q signal;
an adaptive equalizer coupled to the ADC and configured to compensate for channel distortion introduced into the received modulated optical signal from a communication channel;
a digital interferometer configured to decode the equalized first digital I signal and the first digital Q signal to generate an output signal; and
a phase distortion compensator configured to receive the output signal, map the output signal to a phase angle signal using a look-up table, and use the phase angle signal to compensate for a phase distortion in the received output signal caused by a local oscillator frequency offset (LOFO) and generate a compensated output signal from which data information is recovered, the phase distortion introduced into the first I component signal and the first Q component signal by a local oscillator signal utilized by the coherent detector.

8. The optical receiver in accordance with claim 7 wherein the phase distortion compensator is further configured to generate an adaptive phase angle offset signal error signal operable for adjusting the local oscillator signal.

9. The optical receiver in accordance with claim 7 wherein the received modulated optical signal comprises a differential quadrature phase shift key (DQPSK) modulated signal.

10. The optical receiver in accordance with claim 7 wherein the phase distortion compensator is further configured to:
combine a local oscillator frequency offset (LOFO)-based phase angle signal with the phase angle signal to generate a corrected phase angle signal;
process the corrected phase angle signal to generate an information data signal;
combine the corrected phase angle signal with the information data signal to generate an error signal, wherein the LOFO-based phase angle signal is based upon the error signal.

11. The optical receiver in accordance with claim 10 wherein process the corrected phase angle signal to generate the information data signal is performed by a symbol slicer.

12. The optical receiver in accordance with claim 7 the phase distortion compensator comprises:
a digital phase lock loop.

13. A method for signal processing in an optical communications receiver, the method comprising:
receiving a modulated optical signal;
coherently detecting the modulated optical signal and generating a first channel in-phase (I) component, a first channel quadrature (Q) component, a second channel I component and a second channel Q component;
converting the first channel I and Q components to first digital I and Q signals and the second channel I and Q components to second digital I and Q signals;
adaptively equalizing the first digital I and Q signals and the second digital I and Q signals to compensate for channel distortion introduced into the received modulated optical signal from a communication channel;
differentially decoding, by a digital interferometer, the equalized first channel digital I and Q signals and the equalized second digital I and Q signals to generate a first output signal and a second output signal;
receiving the first output signal and the second output signal, mapping the first output signal and the second output signal to a first phase angle signal and a second phase angle signal respectively using a look-up table, and using the first phase angle signal and the second phase angle signal to compensate for phase distortion in the received first output signal and the received second output signal caused by a local oscillator frequency offset (LOFO) and generate a first compensated output signal and a second compensated output signal from which data information is recovered, the phase distortion introduced into the first channel I and Q components and the second channel I and Q components by a local oscillator signal utilized during coherent detection of the modulated optical signal.

14. The method in accordance with claim 13 further comprising:
generating an adaptive phase angle offset signal error signal operable for adjusting the local oscillator signal.

* * * * *